UNITED STATES PATENT OFFICE.

JOSÉ ALTIMIRA, OF NEW YORK, N. Y.

DETERGENT.

SPECIFICATION forming part of Letters Patent No. 572,853, dated December 8, 1896.

Application filed July 3, 1896. Serial No. 597,920. (No specimens.)

*To all whom it may concern:*

Be it known that I, JOSÉ ALTIMIRA, a subject of the King of Spain, and a resident of New York city, in the county of New York and State of New York, have invented and discovered a certain new and useful composition of matter to be used for all kinds of washing, and especially for cleaning printing-molds, of which the following is a specification.

My composition consists of the following ingredients in the proportions stated, viz: pure water, seventy-five gallons; soap-bark, (*Quillaia saponaria, rosaceæ,*) five pounds; essence of peppermint, four ounces; ashes of cork-tree bark, (*Quercus suber, capulifera,*) six pounds; soda-ash, fifty pounds; chlorid of lime, eight pounds; ashes of grape-vines, eight pounds, this solution when used to be further diluted with from five to twenty-five per cent. of water, according to the strength required. It may be used for washing the finest fabrics, wool, silk, cotton, kitchen utensils, crockery, general house-cleaning, and especially for all kinds of printing molds and types. It may be applied with brush or rag or simply as a washing fluid in which the article to be cleaned may be immersed.

The ashes of grape-vines are now imported by me from Catalonia, Spain, via Barcelona, but they are simply the collected ashes of the cultivated grape-vine, *i. e.*, the vine cultivated for the purposes of wine culture, and the Florida or California varieties of that vine may also be used.

The ashes of cork-tree bark are likewise imported by me from Catalonia, Spain, where this tree grows, via Barcelona.

The essence of peppermint is the ordinary peppermint of commerce and is used simply for the scent.

What I claim, and desire to secure by Letters Patent of the United States, is—

The herein-described composition of matter consisting of water, soap-bark, essence of peppermint, ashes of cork-tree bark, soda-ash, chlorid of lime, and ashes of grape-vines in or in about the proportions specified.

Signed at New York city, in the county of New York and State of New York, this 2d day of July, A. D. 1896.

JOSÉ ALTIMIRA.

Witnesses:
SAMUEL H. COHN,
HERMAN M. SOLOMON.